Sept. 13, 1927.

O. HOVDEN 1,642,444

FISH POSITIONING MEANS

Filed July 8, 1925

Inventor

OLAV HOVDEN

By A. B. Bowman

Attorney

Patented Sept. 13, 1927.

1,642,444

UNITED STATES PATENT OFFICE.

OLAV HOVDEN, OF MONTEREY, CALIFORNIA.

FISH-POSITIONING MEANS.

Application filed July 8, 1925. Serial No. 42,212.

My invention relates to a fish positioning means, and the primary object of my invention is to provide improvements over my previous application for Letters Patent for fish beheading and entrail removing machines, filed in the United States Patent Office, July 9, 1823, under Serial Number 650,415. The objects of my improvements are:

First, to provide a means whereby fish or other similar products are placed in predetermined positions against a stop or guide means so that an operation performed on one will be substantially identical on all;

Second, to provide a revoluble brush in combination with and above a continuous conveyor having a plurality of transverse pockets whereby fish, or other similar products, are forced by said brush toward the ends of the pockets in said conveyer against a stop or guide means;

Third, to provide a helical brush mounted on an axis extending in the direction of and positioned above a continuous pocket conveyer having transversely positioned pockets, the tufts of bristles at the lower portion of the brush being positioned in alinement with one of the pockets of the conveyer, the longitudinal advance of the bristles at the lower portion of the brush being identical with the linear speed of the conveyer so as to provide means at all times over said conveyer for forcing the fish or other products contained in the pockets thereof beyond one side of the conveyer;

Fourth, to provide a brush having helically arranged tufts of bristles in combination with a conveyer having transversely positioned pockets, the pitch of the helix of said brush being equal to the longitudinal distance between the pockets of said conveyer;

Fifth, to provide as a whole a novelly constructed and operated fish positioning means of this class, and Sixth, to provide a means of this class which is very simple and economical of construction proportionate to its functions, durable, efficient and which will not readily deteriorate or get out of order.

Figure 2:
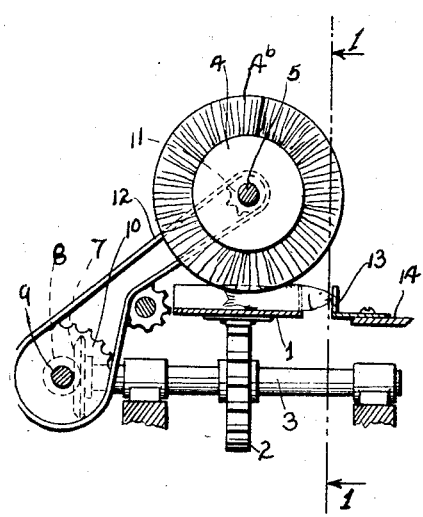
Figure 1:
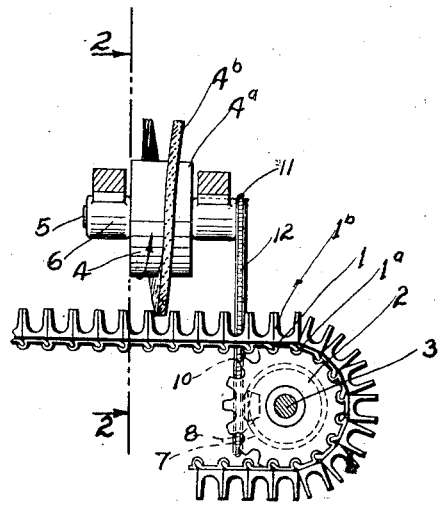
Figure 3:
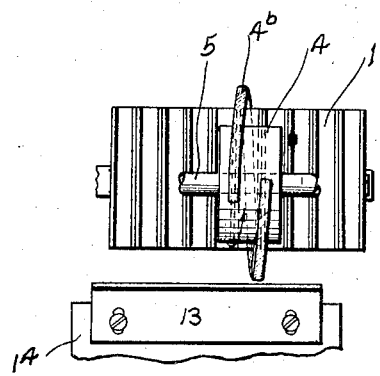

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a fragmentary side view of a continuous pocket conveyer with my fish positioning means in connection therewith, with the view on the line 1—1 of Fig. 2; Fig. 2 is a sectional elevational view thereof, on the line 2—2 of Fig. 1, and Fig. 3 is a fragmentary plan view thereof.

Like characters of reference refer to similar parts and portions throughout the several views of the drawings.

My fish positioning means, as illustrated in the drawings, consists essentially of an endless pocket conveyer 1 mounted on sprockets 2 secured to shafts 3, a brush member 4 mounted on a shaft 5 revolubly mounted in journals 6, bevel gears 7 and 8, shafts 9, sprockets 10 and 11, chain 12, the adjustable stop member 13 and the support 14.

The conveyer 1 consists of a link chain 1ª to the outer sides of which are secured channel or pocket members 1ᵇ which extend transversely with the chain and are of such length as to receive fish therein.

The brush 4 consists of a drum 4ª and tufts of bristles 4ᵇ arranged helically around the periphery of the drum 4ª, the longitudinal pitch of the helix on which the tufts of bristles are arranged being equal to the distance between the center lines of the adjacently positioned channel or pocket members 1ᵇ of the conveyer 1. The tufts of bristles positioned successively at the lower side of the brush 4 are positioned in alinement with one of the pockets of the conveyer and extend preferably a short distance therein as shown best in Figs. 1 and 2. The brush 4 may be variously driven but the longitudinal advance of the helically arranged tufts of bristles equals the linear speed of the conveyer 1.

The means for rotating the shaft 5 on which the brush 4 is mounted consists of a sprocket 11 secured to the shaft 5 and connected, by means of a chain 12, with a drive sprocket 10 secured to a shaft 9 which is provided with a bevel pinion 8 meshing with a bevel gear 7 secured to one end of the shaft 3 on which the sprocket 2 is mounted.

It will be here noted that instead of one row of helically arranged tufts of bristles on the drum 4ª, two or more of such rows may be provided, in which latter case, however, the speed of the shaft 5 is proportionately reduced. In the latter case, also, the distance between the several rows of bristles or the pitch of the helixes is the same as if only one row of bristles is used on the drum. At the one side of the conveyer 1 is positioned an adjustable stop member 13 which is mounted on the support 14. Said stop member serves to stop the heads of fish or other members conveyed in the conveyer 1 when forced beyond the ends of the pockets of the conveyer by the bristles of the brush 4.

Thus, the members positioned in the several pockets of the conveyer 1, when passing below the brush 4, are forced a predetermined and fixed distance beyond the one side of the conveyer, so that fish positioned in the pockets of the conveyer may be incised or beheaded at a uniform distance from their head ends.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a means of the class described, a conveying means provided with pockets, and a revoluble member having outwardly extending, helically arranged members, positioned contiguous to and adapted to align with said pockets, the longitudinal pitch of said helically arranged members being substantially equal to the distance between the pockets of said conveying means.

2. In a means of the class described, a continuous conveyer provided with pockets at one side, and a revoluble member positioned at said one side of said conveyer and provided with spirally arranged members extending therefrom, the spirally arranged extended members at the one side of said revoluble member being substantially in line with the pockets of said conveyer.

3. In a means of the class described, a continuous conveyer provided with transversely positioned long pocket members, and a drum-like brush member, having helically arranged tufts of bristles at the periphery thereof, positioned above said conveyer on an axis parallel with the direction of movement of said conveyer with the tufts of bristles at the lower portion of said brush member substantially in alinement with the pocket members in said conveyer.

4. In a means of the class described, an endless conveyer provided with transversely positioned pocket members, and a brush member, having helically arranged bristles, positioned contiguous to the pocket members of said conveyer on an axis parallel with the direction of movement thereof, the pitch of the helix on which said bristles are arranged being substantially equal to the distance between the pocket members of said conveyer.

5. In a means of the class described, an endless conveyer provided with transversely positioned pockets, and a revoluble brush having angularly arranged tufts of bristles, certain of said tufts of bristles being at all times substantially in line with one of the pockets of said conveyer.

6. In a means of the class described, an endless conveyer provided with transversely positioned pockets, a revoluble brush having angularly arranged tufts of bristles, certain of said tufts of bristles being at all times substantially in line with one of the pockets of said conveyer, and a stop means positioned at one side of said conveyer for stopping the members positioned in said conveyer and projected outwardly by said brush.

7. In a means of the class described, an endless conveyer provided with transversely positioned pocket members, a brush member having helically arranged bristles, positioned contiguous to the pocket members of said conveyer on an axis parallel with the direction of movement thereof, the pitch of the helix on which said bristles are arranged being substantially equal to the distance between the pocket members of said conveyer, and a stop member positioned at the ends of the pocket members of said conveyer adapted to stop and guide the members carried in said pocket members and projected outwardly by the tufts of bristles of said brush member.

In testimony whereof, I have hereunto set my hand at Monterey, California, this 4th day of June, 1925.

OLAV HOVDEN.